US 9,906,385 B2

(12) United States Patent
Rasbornig

(10) Patent No.: US 9,906,385 B2
(45) Date of Patent: *Feb. 27, 2018

(54) COMMUNICATION DEVICES

(71) Applicant: Infineon Technologies AG, Neubiberg (DE)

(72) Inventor: Friedrich Rasbornig, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,419

(22) Filed: Jul. 18, 2016

(65) Prior Publication Data

US 2016/0330051 A1 Nov. 10, 2016

Related U.S. Application Data

(63) Continuation of application No. 14/501,559, filed on Sep. 30, 2014, now Pat. No. 9,397,871.

(51) Int. Cl.
*H04L 25/49* (2006.01)
*H04L 1/00* (2006.01)
*H04L 5/16* (2006.01)

(52) U.S. Cl.
CPC .......... *H04L 25/4902* (2013.01); *H04L 1/005* (2013.01); *H04L 5/16* (2013.01)

(58) Field of Classification Search
CPC . H04L 25/4902; H04L 25/0268; H04L 25/40; H04L 5/14; H03K 9/00
USPC ........................................ 375/219–222, 238
See application file for complete search history.

(56) References Cited

U.S. PATENT DOCUMENTS

| | | |
|---|---|---|
| 5,392,148 A | 2/1995 | Takahashi et al. |
| 5,471,506 A | 11/1995 | Chen |
| 5,519,526 A | 5/1996 | Chua et al. |
| 5,724,393 A | 3/1998 | Dagdeviren |
| 6,366,565 B1 | 4/2002 | Betts |
| 6,639,423 B2 | 10/2003 | Martin et al. |
| 6,697,422 B1 | 2/2004 | Mathai |
| 7,031,458 B2 | 4/2006 | Holcombe et al. |
| 7,359,433 B1 | 4/2008 | Culca |
| 7,372,914 B2 | 5/2008 | Calvin |
| 7,720,089 B2 | 5/2010 | Kadowaki |
| 8,183,982 B2 | 5/2012 | Scherr |
| 8,351,356 B2 | 1/2013 | Nilshloka et al. |
| 8,699,616 B1 | 4/2014 | Hairapetian |
| 8,718,120 B2 | 5/2014 | Kaneko et al. |

(Continued)

FOREIGN PATENT DOCUMENTS

CN 101034956 A 9/2007

OTHER PUBLICATIONS

Notice of Allowance dated Mar. 28, 2016, U.S. Appl. No. 14/501,559.

(Continued)

*Primary Examiner* — Emmanuel Bayard
(74) *Attorney, Agent, or Firm* — Eschweiler & Potashnik, LLC

(57) ABSTRACT

Devices, systems and methods are provided where a request may be transmitted based on a first encoding scheme, and a response to the request may be transmitted based on a second encoding scheme different from the first encoding scheme. The second encoding scheme may comprise an edge-based pulse width modulation encoding scheme.

24 Claims, 4 Drawing Sheets

(56) References Cited

U.S. PATENT DOCUMENTS

| | | |
|---|---|---|
| 8,766,221 B1 | 7/2014 | Chapuis |
| 8,782,503 B2 | 7/2014 | Kaerlyama |
| 8,824,613 B2 | 9/2014 | Shimizu et al. |
| 8,836,270 B2 | 9/2014 | Kajiura et al. |
| 8,868,307 B2 | 10/2014 | Kashima |
| 9,000,675 B2 | 4/2015 | Chang et al. |
| 9,014,390 B2 | 4/2015 | Butler |
| 9,253,798 B2 | 2/2016 | Pani |
| 9,397,871 B2* | 7/2016 | Rasbornig ............ H04L 25/4902 |
| 9,621,379 B2* | 4/2017 | Pauli ................... H04L 25/0264 |
| 2001/0000705 A1 | 5/2001 | Olafsson |
| 2002/0027347 A1 | 3/2002 | Fujita |
| 2002/0063934 A1 | 5/2002 | Sakauchi |
| 2002/0114415 A1 | 8/2002 | Lee et al. |
| 2003/0091183 A1 | 5/2003 | Holcombe |
| 2003/0113118 A1 | 6/2003 | Bartur |
| 2006/0279438 A1* | 12/2006 | Kishi ................... H04B 10/802 341/51 |
| 2008/0170631 A1 | 7/2008 | Bobier |
| 2008/0187322 A1 | 8/2008 | Tuchler |
| 2008/0205489 A1 | 8/2008 | Thijs |
| 2010/0183163 A1 | 7/2010 | Matsui et al. |
| 2011/0099408 A1 | 4/2011 | Yin et al. |
| 2011/0243291 A1* | 10/2011 | McAllister ............ H04J 3/0658 375/376 |
| 2011/0274429 A1 | 11/2011 | Caplan et al. |
| 2011/0289161 A1 | 11/2011 | Rankin, Jr. |
| 2012/0084378 A1 | 4/2012 | Kaneko et al. |
| 2013/0044827 A1 | 2/2013 | Vladan |
| 2013/0266154 A1 | 10/2013 | McCormack et al. |
| 2013/0308501 A1 | 11/2013 | McCormack et al. |
| 2014/0055250 A1 | 2/2014 | Speegle |
| 2014/0185694 A1* | 7/2014 | Akahori ............... H04B 1/1009 375/257 |
| 2014/0273856 A1 | 9/2014 | Kyles et al. |
| 2014/0325322 A1 | 10/2014 | Kaeriyama |
| 2014/0363166 A1 | 12/2014 | Lacovara |
| 2015/0236876 A1 | 8/2015 | Cadugan et al. |
| 2015/0286606 A1 | 10/2015 | Sengoku |
| 2015/0286608 A1* | 10/2015 | Sengoku ............... G06F 13/364 710/313 |
| 2016/0314092 A1* | 10/2016 | Suzuki ................. G06F 13/4291 |
| 2016/0315705 A1* | 10/2016 | Langguth .............. G08C 15/06 |

OTHER PUBLICATIONS

Non-Final Office Action dated Dec. 17, 2015, U.S. Appl. No. 14/501,559.

Non-Final Office Action dated Jun. 30, 2015, U.S. Appl. No. 14/501,659.

* cited by examiner

COMMUNICATION DEVICES

REFERENCE TO RELATED APPLICATION

This application is a continuation of U.S. application Ser. No. 14/501,559 filed on Sep. 30, 2014, the contents of which are incorporated by reference in their entirety.

FIELD

The present application relates to communication devices, systems and methods.

BACKGROUND

For communication between devices, for example in automotive applications, various protocols and encoding schemes are used for data transmission. One protocol frequently employed is the SENT protocol (Single Edge Nibble Transmission). This protocol may for example be used in applications where high resolution data is transmitted for example from a sensor device to an electronic control unit (ECU).

The SPC protocol (Short PWM Code; PWM meaning Pulse Width Modulation) is an extension of the SENT protocol and aims at increasing performance of a communication link and reducing system costs at the same time. To some extent, SPC allows bidirectional communication and is an example of an edge-based PWM protocol. For example, SPC may introduce a half-duplex synchronous communication. A receiver (for example master) generates for example a master trigger pulse on a communication line by pulling it low for a defined amount of time. The pulse width (corresponding to the defined amount of time) is measured by a transmitter (for example slave), for example a sensor, and a transmission, for example a SENT transmission, is initiated only if the pulse width is within a defined limit. The SPC protocol allows choosing between various protocol modes. For example, a synchronous mode, a synchronous mode with range selection or a synchronous transmission with ID selection, where up to four sensors may be connected in parallel to an ECU, may be used. In the latter case, the pulse width of the above-mentioned trigger pulse may define which sensor or other entity will start a transmission. For example, a length of the trigger pulse may indicate an ID of a sensor or other slave device selected for transmission. The sensor or other entity may start the transmission with its own synchronization, which may overlap data pulses.

In conventional SPC systems, the trigger pulse and the response thereto are sent on a same line, such that corresponding hardware for bidirectional communication has to be provided coupled to this line.

DETAILED DESCRIPTION

Figure 1:
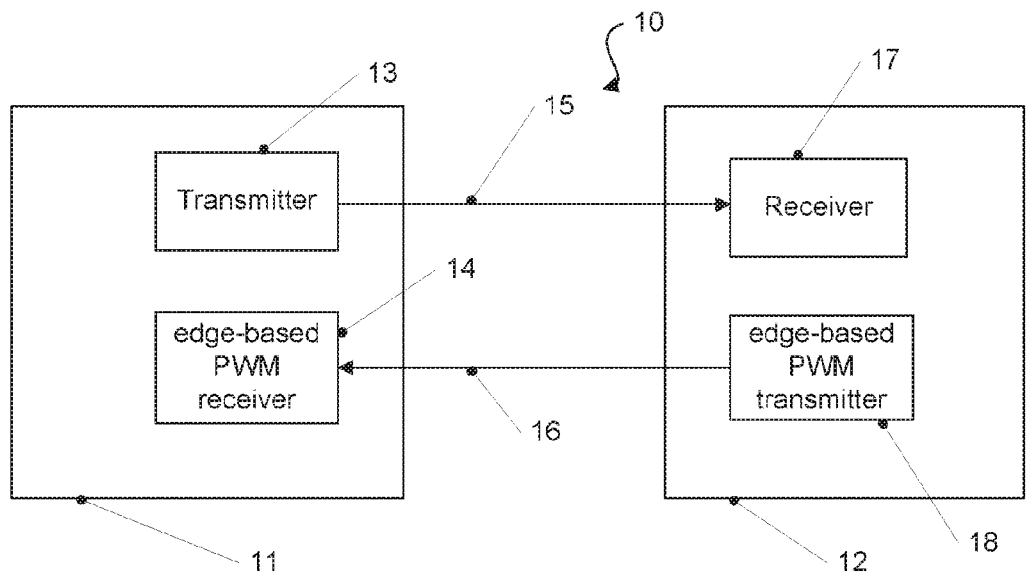
FIG. 1 is a block diagram of a communication system according to an embodiment.

In the following, various embodiments will be described in detail referring to the attached drawings. The embodiments are to be regarded as illustrative examples only and are not to be construed as limiting. For example, while embodiments may be described as comprising a plurality of features or elements, in other embodiments some of these features or elements may be omitted and/or replaced by alternative features or elements. In yet other embodiments, additional features or elements may be provided.

Any connections or couplings shown in the drawings or described herein may be implemented as direct connections or couplings, i.e. connections or couplings without intervening elements, or indirect connections or couplings, i.e. connections or couplings with one or more intervening elements, as long as the general purpose of the connection or coupling, for example to transmit a certain kind of signal and/or to transmit a certain kind of information, is essentially maintained. Connections or couplings may be wire-based connections or couplings or may also be wireless connections or couplings, unless noted otherwise.

Furthermore, features from different embodiments may be combined to form additional embodiments.

In some embodiments, extensions and/or modifications to SPC-based communication may be illustrated and explained. However, these extensions or modifications may also be applicable to other communication protocols, for example other edge-based PWM (Pulse Width Modulation) communication protocols.

In some embodiments, communication from a first device to a second device may be based on a first encoding scheme, and communication from the second device to the first device may be based on a second encoding scheme different from the first encoding scheme. The second protocol may be an edge-based PWM encoding scheme, for example an encoding scheme as used in conventional SENT, SPC or similar protocols. In some embodiments, a message based on the first encoding scheme may be used to initiate a transmission. In some embodiments, the first encoding scheme may involve modifying a supply voltage. An encoding scheme as used herein may refer to the way signals are generated based on data or other information to be transmitted. For example, in edge-based PWM encoding schemes one or more pulses may be sent, pulse duration(s) corresponding to data values or other information to be transmitted. A distance between pulses sent consecutively may be approximately the same, so the duration of the transmission may depend on the data values or other information transmitted. In other encoding schemes, bits may be transmitted consecutively, and for each bit a same duration may be allocated. In such cases, an overall transmission time may be the same irrespective of the data values transmitted. Other approaches may also be used. Devices, methods and systems implementing such embodiments may be provided. In some embodiments, such devices or systems may be implemented in hardware, software, firmware or combinations thereof.

In some embodiments, the first device may be a master device like an electronic control unit (ECU), and the second device may be a slave device, for example a sensor.

In some embodiments, the first encoding scheme may also be used to perform further control functions besides triggering or selecting the second device, for example be used to perform testing of the second device. In some embodiments, the first encoding scheme may be also used in a protocol useable for testing purposes.

Turning now to the figures, in FIG. 1 a communication system 10 according to an embodiment is illustrated. The illustrative system of FIG. 1 comprises a first communication device 11 and a second communication device 12. In some embodiments, first communication device 11 may be an electronic control unit (ECU) or other kind of controller, but is not limited thereto. In some embodiments, second communication device 12 may be a sensor or other device controlled by first communication device 11, but is not limited thereto.

First communication device 11 comprises a transmitter 13 which transmits signals via a communication connection 15 to a receiver 17 of second communication device 12. Transmitter 13 and receiver 17 may operate based on a first encoding scheme. In some embodiments, communication connection 15 may be a voltage supply line, and the encoding scheme used by transmitter 13 and receiver 17 may involve modifying a voltage on voltage supply line 15. In other embodiments, other techniques may be employed.

In some embodiments, the first encoding scheme may be an encoding scheme also used in a protocol usable for chip testing. In some embodiments, the first encoding scheme may be an encoding scheme as used in a serial peripheral interface (SPI) protocol.

In some embodiments, signals sent by transmitter 13 to receiver 17 may trigger a response from second communication device 12 to first communication device 11. Second communication device 12 comprises an edge-based PWM (Pulse Width Modulation) transmitter which transmits a pulse width modulated signal to an edge-based PWM receiver 14 of first communication device 11 via a second communication channel 16. Second communication channel 16 may for example comprise a data line. Using edge-based PWM transmitter 18, second communication device 12 may for example respond to a request for data transmission received at receiver 17. Edge-based PWM transmitter 18 uses a second encoding scheme different from the first encoding scheme used by transmitter 13. The second encoding scheme comprises an edge-based PWM encoding scheme in the embodiment of FIG. 1, e.g. an encoding scheme as used in conventional SPC and/or SENT protocols. Other techniques may also be used.

Communication system 10 illustrated in FIG. 1 illustrates a communication between a first communication device 11 and a second communication device 12. In other embodiments, other techniques may be used.

In other embodiments, more than two devices may be provided in a communication system. A corresponding embodiment is illustrated in FIG. 2.

Figure 2:
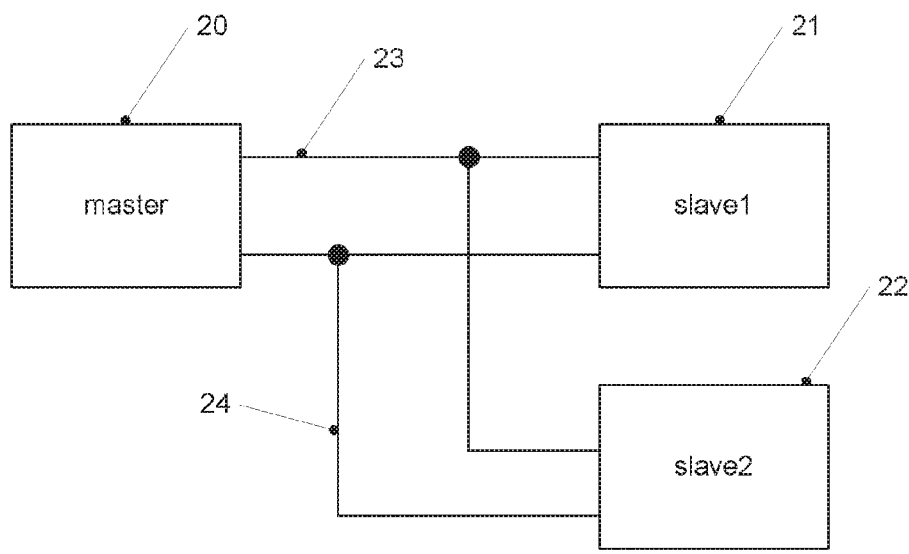
FIG. 2 is a block diagram illustrating a communication system according to a further embodiment.

A communication system illustrated in FIG. 2 comprises a master device 20 and slave devices 21, 22. While in FIG. 2 two slave devices 21, 22 are shown for illustration purposes, the number of slave devices is not limited, and other numbers of slave devices may be used, as illustrated by dots in FIG. 2. Master device 20 in some embodiments may be implemented similar to communication device 11 of FIG. 1, and slave devices 21, 22 may be implemented similar to second communication device 12 of FIG. 1. In such an implementation, master device 20 may transmit signals to slave devices 21, 22 using a first encoding scheme via a first communication connection 23. First communication connection 23 may in some implementations be a voltage supply line, and the first encoding scheme may involve modifying a voltage on voltage supply line 23. In some embodiments, the first encoding scheme may be an ecoding scheme as used in a conventional SPI-based protocol. In some embodiments, using the first encoding scheme master device 20 may select one of slave devices 21, 22 to transmit information to master device 20.

Slave devices 21, 22 may transmit signals to master device 20 via a second communication connection 24 using a second encoding scheme. The second encoding scheme may be an edge-based PWM encoding scheme. In some embodiments, the second encoding scheme may be based on a conventional SENT protocol or based on a conventional SPC protocol without trigger pulses. In other embodiments, other techniques may be used. Modifications and variations discussed with reference to FIG. 1 may also apply to the embodiment of FIG. 2.

Figure 3:
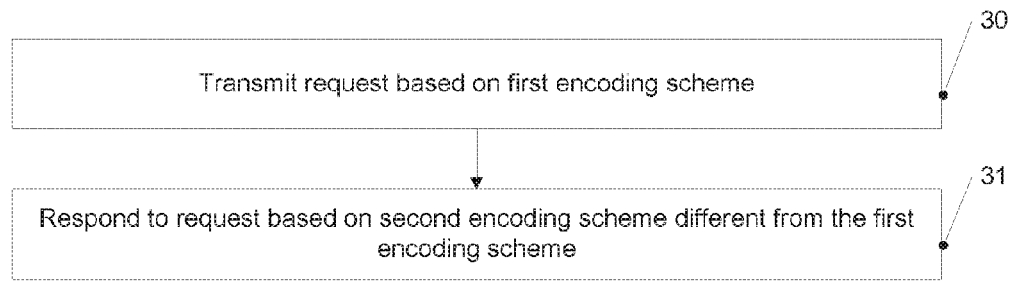
FIG. 3 is a flowchart illustrating a method according to an embodiment.

In FIG. 3, a method according to an embodiment is illustrated. The method of FIG. 3 may be implemented in devices and systems discussed with reference to FIGS. 1 and 2 above or discussed with reference to FIGS. 6 to 9 later, but may also be used independently therefrom.

At 30, a request is transmitted from a first communication device to a second communication device based on a first encoding scheme. In some embodiments, the first encoding scheme may comprise modifying a voltage on a voltage supply line. In some embodiments, the first encoding scheme may based on an encoding scheme as used in a conventional SPI-based protocol. In some embodiments, the request may identify the second communication device out of a plurality of possible second communication devices, for example a plurality of slaves.

At 31, the method comprises responding, by the second communication device, to the request based on a second encoding scheme different from the first encoding scheme. The second encoding scheme in some embodiments may be an edge-based PWM encoding scheme. An edge-based PWM encoding scheme may be an encoding scheme where edges of pulse width modulated signals are detected, and information like data to be transmitted is encoded for example in pulse lengths of the pulse width modulated signal. The response may for example comprise sensor data captured by the second communication device.

To illustrate the techniques, concepts and embodiments illustrated with reference to FIGS. 1 to 3 further, next with reference to FIGS. 4 and 5 example signals will be discussed. The example signals of FIGS. 4 and 5 merely serve illustrative purposes and are not to be construed as limiting. In particular, in other implementations different signal waveforms from the ones shown may be used.

Figure 4:
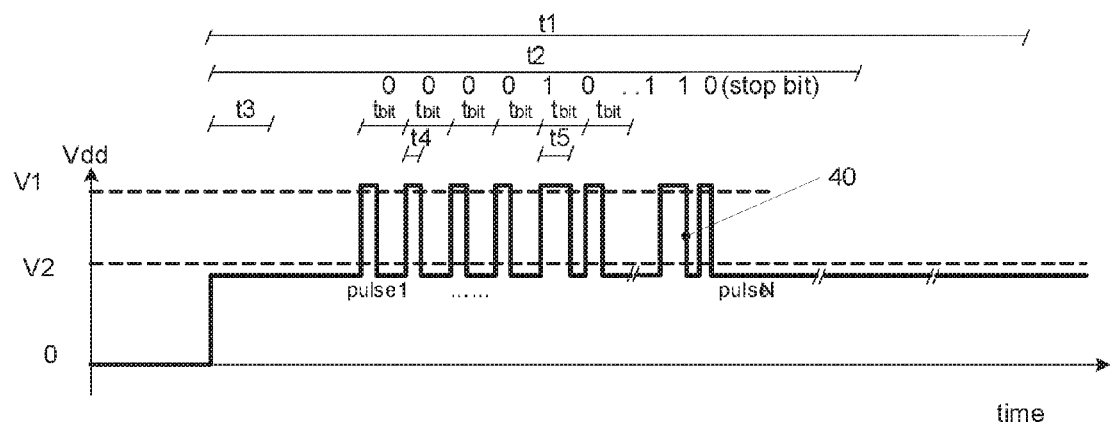
FIGS. 4 and 5 are diagrams illustrating example signals according to some embodiments.

In FIG. 4, an example for signals generated using an encoding scheme involving modulation of a supply voltage, for example a positive supply voltage Vdd, is illustrated. A curve 40 shows an example behavior of the voltage level during transmission of a signal for an example implementation. The encoding scheme employed in FIG. 4 may for example be an encoding scheme as used in a conventional SPI protocol which may in some cases be used for testing purposes like triggering a built-in self-test or for reading internal registers of a chip.

In the example of FIG. 4, information to be transmitted is encoded in a corresponding pattern of low and high pulses. For example, shorter pulses correspond to low pulses (bit value of 0), while longer pulses may correspond to high pulses (bit value of 1). For example, a duration t4 associated with low pulses may be one third of a duration $t_{bit}$ assigned to transmission of a single bit while a time t5 associated with a high pulse may be two thirds of $t_{bit}$. In the encoding scheme of FIG. 4, therefore each bit has a fixed duration $t_{bit}$. The last pulse (pulse N) may correspond to a stop bit. The number of pulses may vary depending on the implementation.

A high voltage level may correspond to a voltage V1, and a low level to a voltage V2. In some embodiments usable for example in automotive applications, V1 may be about 14 V, and V2 may be about 9 V, although these values may vary according to an implementation used. Times t1 to t3 denote times which are used when signals as illustrated in FIG. 4 are used for testing purposes, for example testing of an ASIC (application specific integrated circuit). For example, time t1 denotes a time t1 starting from a power up of the ASIC and transmission of a start test command. When within time t1 no further communication with a test interface occurs, a test mode is ended. Time t2 denotes a time during which it may be possible to activate a test interface of the ASIC. An end of time t3 denotes an earliest possible time after power-up of the ASIC after which time t3 the test interface may be activated. In other embodiments, other times may apply. In the bits, for example a slave device may be identified in a system as discussed with reference to FIG. 2, and/or a communication device may be triggered to respond to the information. In some embodiments, the signal shown in FIG. 4 may replace a trigger pulse used in conventional SPC systems. In some embodiments, further commands and functions may be encoded in the bits transmitted with the signal of FIG. 4. For example, a built-in self-test may be triggered, registers may be written to or a reading from registers may be triggered, or configurations like a measurement range may be set. In some embodiments, signaling as discussed with reference to FIG. 4 based on a first encoding scheme may be implemented for such additional purposes in a system anyway, such that in such embodiments additionally using the first encoding scheme for replacing a trigger pulse requires little additional effort. For example, communication based on a protocol using such an encoding scheme may be implemented for purposes of back-end testing in a sensor. In some embodiments, the signals in FIG. 4 may also be used for reading additional internal information of a communication device vice like a sensor, for example contents of registers, changing a configuration of the sensor like a measurement range or triggering an internal test for checking a functionality of the sensor.

Figure 5:
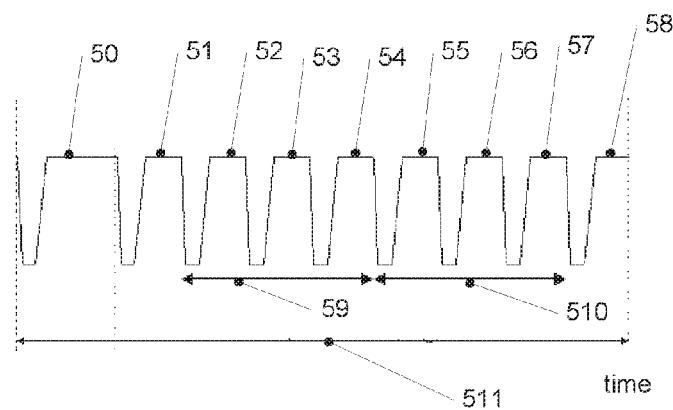

In FIG. 5, an example for an edge-based pulse width modulated message, which may correspond to an SPC message without a trigger pulse (also referred to as trigger nibble) is illustrated. This may be an example for a message based on the second encoding scheme of the embodiments of FIGS. 1 to 3. In other embodiments, other techniques may be used.

The signal illustrated in FIG. 5 includes pulses, also referred to as nibbles. To be more precise, in the example case of FIG. 5 a synchronization/calibration pulse 50 is followed by a status pulse 51 and six data pulses 52 to 57. At the end, a CRC check-sum pulse 58 is transmitted. Each of pulses 51 to 58 may encode a four-bit value, the length of the pulse for example corresponding to the respective encoded bit value. Other techniques may also be used. The data pulses may be partitioned in a first signal 59 and a second signal 510, each encoding twelve bits. A total length 511 of the message may vary depending on the bit values encoded. In other words, in contrast to the example of FIG. 4, in the case of FIG. 5 a length for each bit is not fixed, but for example low phases between pulses may be the same. For example, for an SPC-based message a total length 511 may be between 456 µs and 816 µs, although in other implementations the duration may vary. A duration of each pulse may comprise an offset, for example of 36 µs for SPC-based signals, plus a duration of x·3 µs, x ranging from 0 to 15 depending on the four-bit value encoded. However, the numerical values merely serve illustration purposes and may vary in other implementations. The message illustrated in FIG. 5 may be transmitted in the voltage domain in some embodiments, a high value for example corresponding to a voltage of 5 V and a low value to a voltage of 0 V, although in other embodiments other values may be used.

The pulses of FIG. 5 may for example be generated by an open drain driver pulling for example a voltage on a data line towards ground when active, the voltage being pulled toward a positive supply voltage like Vdd by a pull-up resistor when the open drain driver is inactive. In other embodiments, push-pull drivers may be used.

For example, a message as illustrated in FIG. 5 may be sent by a communication device like second communication device 12 of FIG. 12 or slave devices 21 or 22 of FIG. 2 each time the respective device receives a message for example as illustrated in FIG. 4 triggering the sending of the message of FIG. 5.

Figure 6:
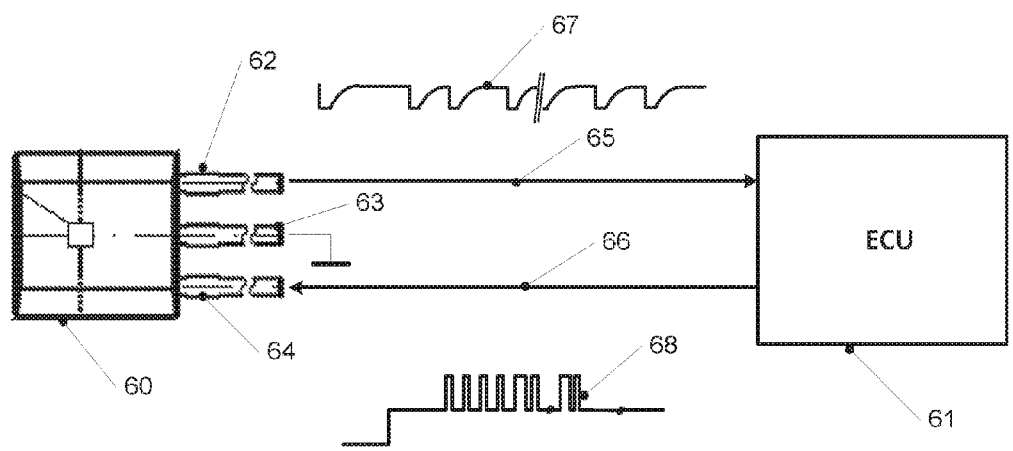
FIG. 6 is a diagram illustrating a communication system according to an embodiment.
Figure 7:
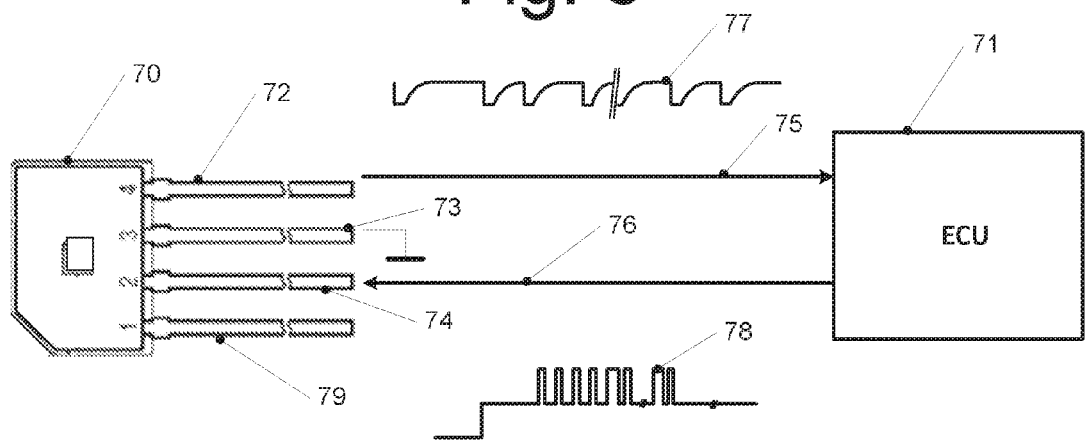
FIG. 7 is a block diagram illustrating a communication system according to a further embodiment.
Figure 8:
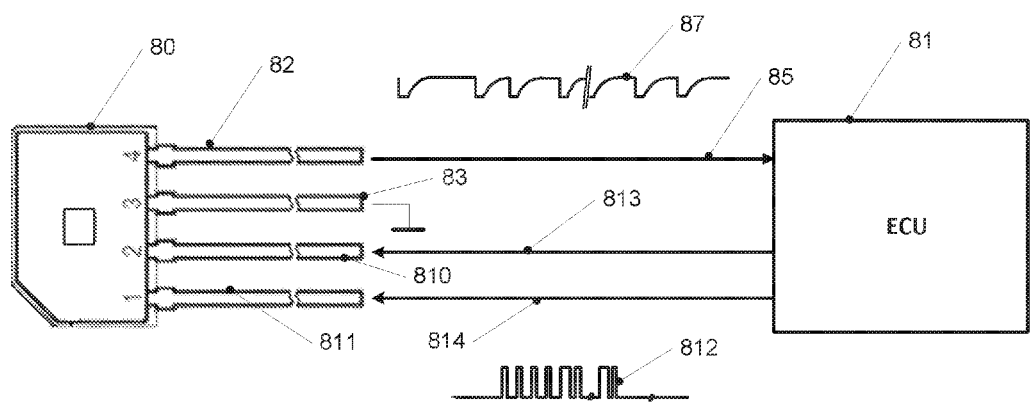
FIG. 8 is a block diagram illustrating a communication system according to a further embodiment.

In the following, with respect to FIGS. 6 to 8 various embodiments will be discussed where a sensor communicates with an electronic control unit (ECU). While a single sensor is shown in FIGS. 6 to 9, in other embodiments a plurality of sensors may be provided, for example similar to the plurality of slave devices illustrated in FIG. 2. In other embodiments, other devices than sensors may be used, and/or other devices than ECUs, for example other types of controllers, may be used.

In FIG. 6, a sensor 60 is coupled with an ECU 61. In the embodiment of FIG. 6, sensor 60 is provided in a three-pin package having pins 62, 63 and 64. Sensor 60 may for example be an acceleration sensor, a temperature sensor, a magnetic field sensor or any other desired type of sensor. Sensor 60 in some embodiments may be used in automotive applications.

In the embodiment of FIG. 6, pin 62 may be a data pin used to send data from sensor 60 to ECU 61 via a connection 65. Connection 65 may be a wire-based connection.

Pin 63 in the embodiment of FIG. 6 may be a ground pin coupled to ground as illustrated. Pin 64 may be a pin for supplying a positive supply voltage like Vdd. In operation, ECU 61 may modify the positive supply voltage on a supply voltage line 66 to transmit a message to sensor 60, as indicated by a message 68. The message may be according to a first encoding scheme, for example as used in an SPI protocol and/or a protocol also used for testing purposes. For example, the first encoding scheme may use signals as illustrated and explained with respect to FIG. 4. Responsive to receiving a corresponding message 68, in the illustrative embodiment of FIG. 6 sensor 60 responds with an SPC message 67, for example as illustrated and explained with respect to FIG. 5. Other edge-based PWM messages and encoding schemes or other suitable techniques may also be used. Levels for modifying the positive supply voltage as illustrated at 61 may for example be 9 V and 14 V, and voltage levels for message 67 may be 0 V and 5 V, although in other embodiments other values may apply.

In FIG. 7 an embodiment is shown where a sensor 70 communicates with a ECU 71. Elements 70 to 78 of FIG. 7 correspond essentially to elements 60 to 68 of FIG. 6 and will therefore not be described again in detail. In the embodiment of FIG. 7, sensor 70 is provided in a package comprising four pins 72, 73, 74 and 79.

Of these pins, pins 72 to 74 correspond to pins 62 to 64 of FIG. 6. An additional pin 79 of sensor 70 is not used in the embodiment of FIG. 7, or may be used for other purposes than communication with ECU 71.

In FIG. 8, an embodiment of a communication system is illustrated where a sensor 80 communicates with an ECU 81. In the embodiment of FIG. 8, sensor 80 is provided in a four-pin package. Pins 82 and 83 correspond to pins 62 and 63 of FIG. 6 and will not be described again in detail. For example, pin 82 may be coupled to a data line 85 corresponding to data line 65 of FIG. 6, and SPC-based messages or other edge-based PWM messages as indicated by 87 may be transmitted from sensor 80 to ECU 81 via data line 84. Message 87 may for example be a message as discussed with reference to FIG. 5, optionally including variations discussed with reference to FIG. 5.

Pin 810 in the embodiment of FIG. 8 is a voltage supply pin which in the embodiment of FIG. 8 receives a positive supply voltage like Vdd via a voltage supply line 813. In the embodiment of FIG. 8, the voltage on voltage supply line 813 is not modulated, although it may be modulated to transmit messages in other embodiments.

Furthermore, pin 811 of sensor 80 in the embodiment of FIG. 8 may be a receive pin to receive messages as indicated by 812 via a communication connection 814 from ECU 81. Messages 812 may be based on an encoding scheme as used e.g. in an SPI protocol or other protocol different from the encoding scheme used for message 87. For example, essentially signals as discussed with reference to FIG. 4 may be used, although voltage level V1 and V2 may differ. For example, in the embodiment of FIG. 8 V1 may be 0 V and V2 may be 5 V, but is not limited thereto. In other words, in the embodiment of FIG. 8 the supply voltage on supply voltage line 813 is constant, and a voltage on an additional line 814 is modulated to transmit messages from ECU 81 to sensor 80.

As explained previously, message 812 may for example trigger a sending of message 87.

Figure 9:
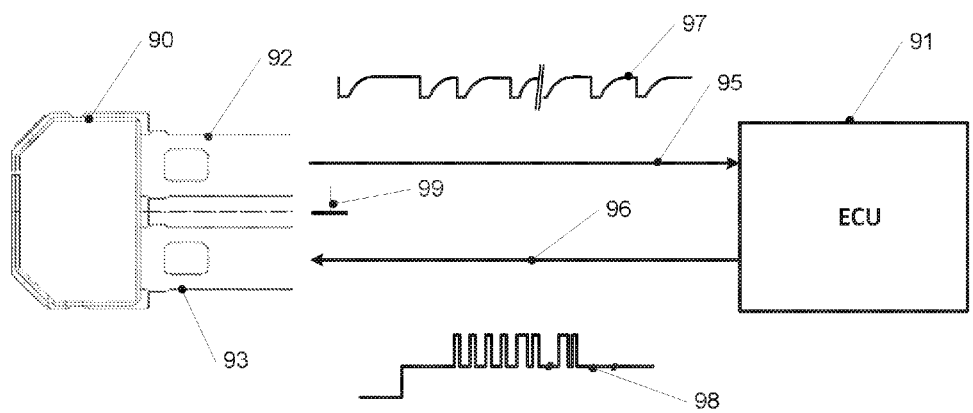
FIG. 9 is a block diagram illustrating a communication system according to a further embodiment.

FIG. 9 illustrates a further embodiment of a communication system where a sensor 90 communicates with an ECU 91. In the embodiment of FIG. 9, sensor 90 is provided in a two-pin package having pins 92 and 93. Pin 92 may be a pin used to transmit data from sensor 90 to ECU 91 via a communication connection 95. In the embodiment of FIG. 9, for example a message 97 may be transmitted, which may be based on an encoding scheme as used e.g. in an SPC or similar edge-based pulse width modulation protocol. In the embodiment of FIG. 9, message 97 may be transmitted in the current domain. For example, a high value may correspond to a first current, for example 14 mA, and a low signal value may correspond to a second current, for example about 7 mA, although in other embodiments the values may differ. In other embodiments, message 97 may be transmitted in the voltage domain, as explained previously. In yet other embodiments, in the embodiments of FIGS. 6 to 8 current domain messages may be used instead of voltage domain messages. In the embodiment of FIG. 9, pin 92 used for outputting message 97 may be a ground pin, as indicated by 99 in FIG. 9. In other words, in the embodiment of FIG. 9 a ground pin additionally may be used to output messages like message 97, e.g. messages is the current domain.

Furthermore, pin 93 in FIG. 9 may be a supply voltage pin for receiving a positive supply voltage, for example Vdd, via a voltage supply line 96. As for example explained with reference to FIG. 4, ECU 91 may modulate the voltage on voltage line 96 to transmit for example a message 98. Message 98 may for example trigger sending of message 97 in some embodiments.

While with reference to FIGS. 6 to 9 sensor packages with two pins, three pins and four pins have been discussed, in other embodiments other pin numbers may be used.

The above-mentioned embodiments are to be regarded as examples only and are not to be construed as limiting, as the techniques and concepts disclosed herein may also be implemented in other devices, systems or methods, as apparent to persons skilled in the art.

What is claimed is:

1. A communication device, comprising:
   a transmitter circuit adapted to transmit messages to at least one further communication device, the transmitter circuit operating based on a first encoding scheme on a first communication connection,
   a receiver circuit adapted to receive messages from the at least one further communication device, the receiver circuit being adapted to operate based on a second communication encoding scheme different from the first encoding scheme on a second communication connection different from the first communication connection,
   wherein at least one of the first encoding scheme or the second encoding scheme comprises an edge-based pulse width modulation encoding scheme, and
   wherein the other one of the first or second encoding scheme comprises modulating a supply voltage on a supply voltage line.

2. The communication device of claim 1, wherein the edge-based pulse width modulation encoding scheme comprises transmission of a message comprising a plurality of pulses, a width at least of some of the pulses encoding a data value.

3. The communication device of claim 1, wherein the edge-based pulse width modulation encoding scheme comprises a transmission of messages in at least one of a voltage domain or a current domain.

4. The communication device of claim 1, wherein the other one of the first and second encoding schemes comprises transmitting pulses corresponding to bits, wherein equal time durations are provided for transmission of each bit.

5. The communication device of claim 1, wherein the transmitter is adapted to transmit a trigger message requesting a response message from the further device based on the first encoding scheme, and wherein the receiver is adapted to receive the response message with the response message from the further device based on the second encoding scheme.

6. The communication device of claim 1, wherein the receiver is adapted to receive a trigger message from the further communication device based on the first encoding scheme requesting a response message, and wherein the transmitter is adapted to transmit the response message based on the second encoding scheme.

7. The communication device of claim 1, wherein the other one of the first and second encoding scheme is used in a device testing protocol of the communication device.

8. The communication device of claim 1, wherein the trigger message is configured to identify the further device out of a plurality of further devices.

9. A communication device, comprising:
   a transmitter circuit adapted to transmit a trigger message to at least one further communication device by modulating a supply voltage on a voltage supply line, and a receiver circuit adapted to receive an edge-based pulse width modulated response message in response to the trigger message on a data line.

10. The communication device of claim 9, wherein the trigger message is adapted to select one of a plurality of further communication devices, wherein the receiver circuit is adapted to receive the response message from the selected one of the plurality of further communication devices.

11. The communication device of claim 9, wherein in the trigger message a same duration is allocated for each of a plurality of transmitted bits, and in the response message a duration allocated to each of a plurality of data units depends on a value of the data unit.

12. A communication device, comprising:
a receiver circuit adapted to receive a trigger message from a further communication device by detecting a modulation of a supply voltage on a voltage supply line, and
a transmitter circuit adapted to transmit an edge-based pulse width modulated response message in response to the trigger message on a data line.

13. The communication device of claim 12, wherein the transmitter circuit is adapted to transmit the response message only if the trigger message identifies the communication device out of a plurality of communication devices.

14. The communication device of claim 12, wherein in the response message a duration allocated to each of a plurality of data units depends on a value of the data unit and encodes 4 bits.

15. The communication device of claim 12, wherein the response message comprises a synchronization/calibration pulse followed by a status pulse and data pulses.

16. A communication system, comprising:
a first communication device, the first communication device comprising a first transmitter coupled to a first communication connection, the first transmitter being adapted to operate based on a first encoding scheme, and a first receiver coupled to a second communication connection, the first receiver being adapted to operate based on a second encoding scheme different from the first encoding scheme, the second encoding scheme comprising an edge-based pulse width modulation encoding scheme, and
a plurality of second communication devices, the plurality of second communication devices each comprising a second receiver coupled to the first communication connection, the second receiver being adapted to operate based on the first encoding scheme, and a second transmitter coupled to the second communication connection, the second transmitter being adapted to operate based on the second encoding scheme,
wherein the first transmitter of the first communication device is adapted to transmit a single message identifying a particular second communication device of the plurality of second communication devices,
wherein the first transmitter is adapted to request a response message from the particular second communication device based on the first encoding scheme, and wherein the second receiver of the particular second communication device is adapted to receive the trigger message and the second transmitter of the particular second communication device is adapted to transmit a response message comprising a plurality of data bits from the particular second communication device based on the second encoding scheme.

17. The communication system of claim 16, wherein the first communication connection is a positive supply voltage line, and the first encoding scheme comprises modulating a supply voltage on the positive supply voltage line.

18. The communication system of claim 16, wherein the first communication device comprises an electronic control unit, and wherein the plurality of second communication device comprises a plurality of sensors.

19. The communication system of claim 16, wherein the second encoding scheme comprises transmission of SPC messages.

20. A method, comprising:
transmitting a request from a first communication device to a second communication device based on a first encoding scheme modulating a supply voltage on a supply voltage line, and
responding to the request by the second communication device based on a second encoding scheme different from the first encoding scheme, the second encoding scheme comprising an edge-based pulse width modulation encoding scheme.

21. The method of claim 20, wherein transmitting the request comprises identifying the second communication device out of a plurality of second communication devices.

22. The method of claim 20, wherein the second encoding scheme comprises sending messages in one of a voltage domain or a current domain.

23. The method of claim 20, wherein the second encoding scheme comprises sending pulses corresponding to 4-bit values, different time durations being assigned to transmissions of pulses corresponding to different 4-bit values.

24. The communication device of claim 1, wherein the edge-based pulse width modulation protocol defines data pulses, each data pulse encoding 4 bits.

* * * * *